United States Patent [19]

Doakley et al.

[11] Patent Number: 5,050,338

[45] Date of Patent: Sep. 24, 1991

[54] ELECTROSTATIC DUSTING APPARATUS AND METHOD THEREFOR

[76] Inventors: Peter P. Doakley, 7865 N. 49th Ave., Glendale, Ariz. 85301; Christopher M. Bruemmer, 7202 W. Turney, Phoenix, Ariz. 85033

[21] Appl. No.: 435,155

[22] Filed: Nov. 13, 1989

[51] Int. Cl.[5] ............................................ A01M 1/20

[52] U.S. Cl. ............................................ 43/132.1

[58] Field of Search ...................... 43/132.1, 124, 125; 269/3, 690

[56] References Cited

U.S. PATENT DOCUMENTS

| | | | |
|---|---|---|---|
| 3,322,623 | 5/1967 | Doakley | 167/39 |
| 4,476,515 | 10/1984 | Coffee | 43/132.1 |
| 4,805,341 | 2/1989 | Maeda | 43/132.1 |

*Primary Examiner*—Kurt Rowan
*Attorney, Agent, or Firm*—Don J. Flickinger; Jordan M. Meschkow

[57] ABSTRACT

An apparatus for applying an electrostatic charge to pesticide dust and for applying the charged dust to a building's sewer system or a municipality's sewer system is disclosed. A blower exhausts forced air into a reservoir that contains pesticide dust. The dust becomes airborne and exits the reservoir with the forced air. From the reservoir, the dust travels through a charging chamber. The charging chamber includes a conductive tube and an electrode positioned within and insulated from the tube. The electrode is formed as a wire brush having a multiplicity of conductive bristles which are distributed through a substantial volume of the interior of the charging chamber. The electrode is energized to around 15–25 KV. As the dust comes into close proximity with the electrode, it becomes electrostatically charged and then moves out of the charging chamber. After exiting the charging chamber, the dust and forced air exit the apparatus from a nozzle in a delivery hose. The nozzle is specifically configured to mate with a building's clean-out plug or an opening in a municipal sewer system's manhole cover. The dust then covers the interior of the sewer system. When used in connection with a building's sewer system, screens are placed over the building's vent pipes to prevent pests from escaping.

1 Claim, 2 Drawing Sheets

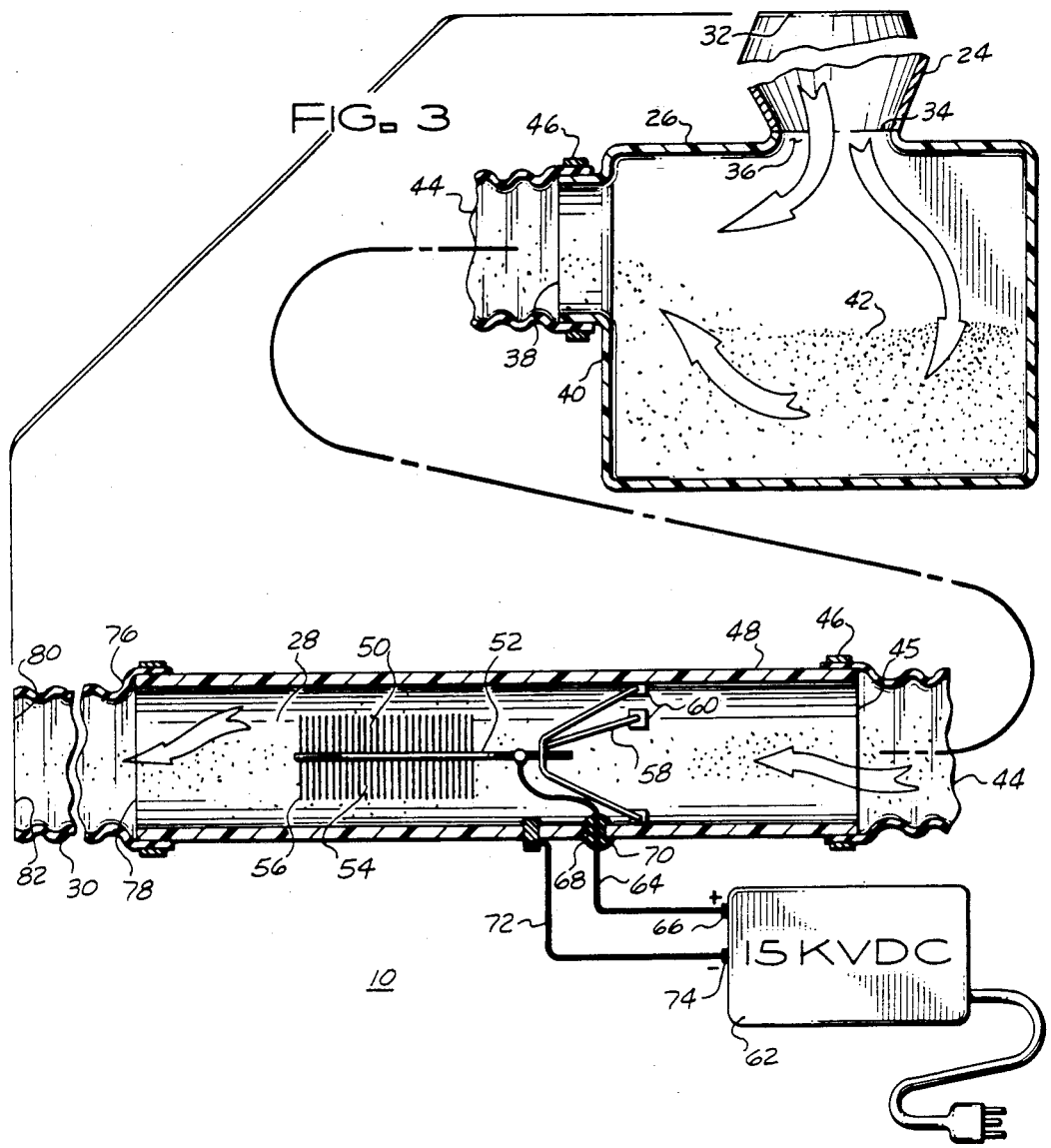
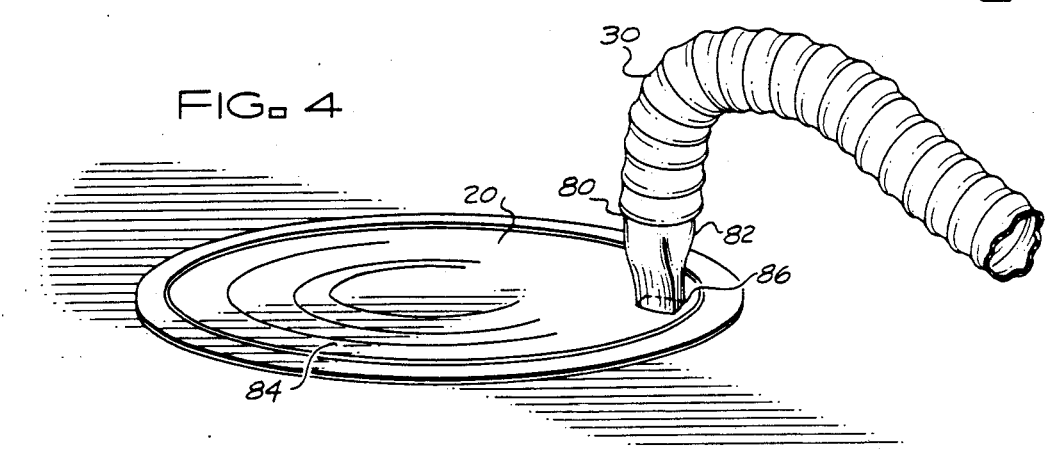

ELECTROSTATIC DUSTING APPARATUS AND METHOD THEREFOR

TECHNICAL FIELD OF THE INVENTION

The present invention relates generally to an apparatus and method used in pest control. More specifically, the present invention relates to an apparatus and method for electrostatically charging pesticide dust and for applying the dust to draining systems in order to control pests.

BACKGROUND OF THE INVENTION

The sewer roach, along with other common insects and pests, pose numerous well known problems to the health and well being of humans who live with and around them. On-going attempts to exterminate them have continued for years, but they are exceedingly difficult to exterminate. Most extermination attempts achieve only temporary success at best. The extermination problem is worsened by the requirement that chemicals used in extermination attempts be relatively safe for the humans, animals, and plants around which these pests live.

These pests often breed and reside in sewers or other building and municipal draining systems. The sewers are ideally suited for the viability of pests because they provide a continuous supply of organic material upon which the pests feed, and they provide shelter. In addition, since sewers are typically constructed with few access ports between long expanses of pipe, pesticides are introduced into remote sections of a sewer or draining system only with great difficulty.

One technique for applying pesticide to sewers is described in U.S. Pat. No. 3,322,623, issued to Peter P. Doakley, and entitled "Method of Inhibiting Roach Infestation in Waste Disposal Systems with Electrostatic Bentonite-Pesticide Composition." The disclosure of this '623 patent is incorporated herein, in its entirety, by reference. This patent discloses an apparatus and method for electrostatically charging a specifically formulated pesticide dust and for applying this charged dust into manholes in a municipal sewer system. The application of electrostatically charged pesticide dust, regardless of the composition, to a sewer has proven to be an effective technique in the extermination of pests. The electrostatically charged dust tends to provide generally good coverage of the interior of a sewer and tends to exhibit generally good retention.

However, the system and method described in the '623 patent is undesirably inefficient in the delivery of pesticide. Specifically, a tremendously large quantity of pesticide dust is consumed in order to achieve adequate coverage and good retention. Only a small portion of the pesticide dust actually adheres to sewer walls, and the bulk of the pesticide dust forms drift or is otherwise wasted. Moreover, the apparatus utilized in the '623 patent is undesirably heavy and bulky. The large quantity of pesticide dust required by this apparatus and the large size of this apparatus has limited its use to being a truck-mounted system which is only practical for use by municipalities with municipal sewer systems. Specifically, its large size has made it unsuited for use in connection with private residences or businesses.

SUMMARY OF THE INVENTION

Accordingly, it is a advantage of the present invention that an improved apparatus and method for applying electrostatically charged pesticide dust is provided.

Another advantage of the present invention is that an apparatus and method exhibiting improved efficiency in the application of pesticide dust is provided.

Yet another advantage is that the present invention provides an apparatus which may be configured in a portable form which utilizes minimal quantities of pesticide dust so that it is applicable to both residence and business use.

The above and other advantages of the present invention are carried out in one form by an improved apparatus for electrostatically charging and applying a pesticide. The apparatus includes a device which moves air. An exhaust from the device which moves air couples to a reservoir configured to hold the pesticide. A charging device couples to the reservoir and is configured so that it imparts a static charge to the pesticide. A delivery device couples to the charging device and is adapted to introduce the pesticide into a target area.

The above and other advantages of the present invention are carried out in another form by an improved method for exterminating pests from a draining system. The method forces air into a reservoir which holds a pesticide dust. The forcing of air into the reservoir propels the pesticide dust along with the air out from the reservoir. The method then electrostatically charges the propelled pesticide dust to produce ionized dust, and routes the ionized dust and air into the draining system.

BRIEF DESCRIPTION OF THE DRAWINGS

A more complete understanding of the present invention may be derived by referring to the detailed description and claims when considered in connection with the FIGURES, wherein like reference numbers refer to similar items throughout the FIGURES, and:

FIG. 3 shows a schematic view of the present invention; and

FIG. 4 shows a perspective view of a second embodiment of a nozzle portion of the present invention in relation to a typical municipal sewer manhole cover.

DETAILED DESCRIPTION OF THE PREFERRED EMBODIMENTS

Figure 1:
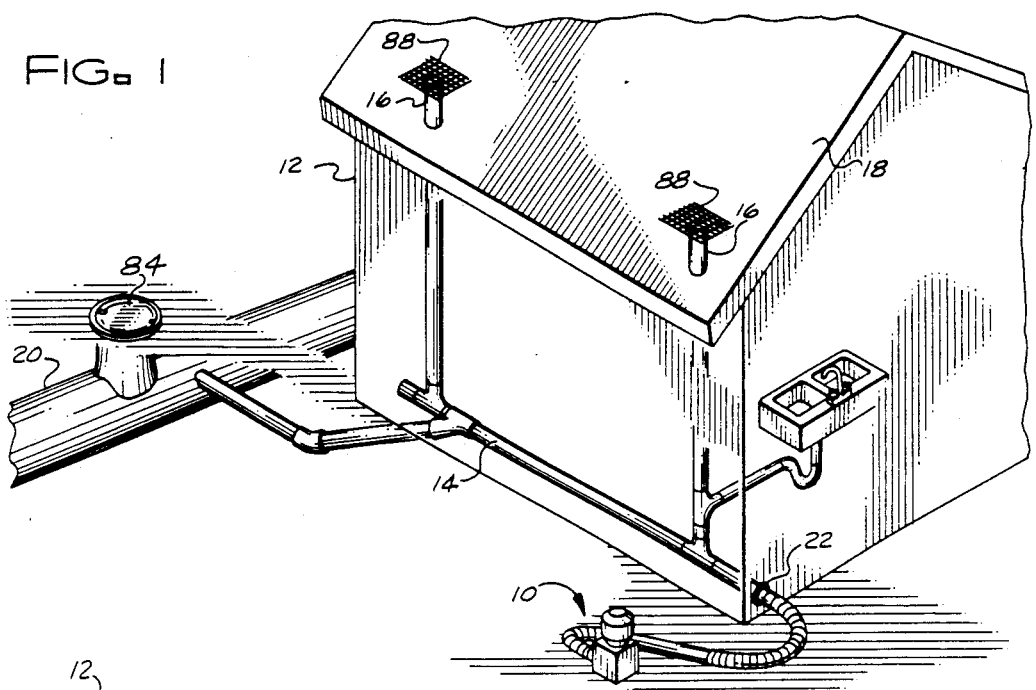
FIG. 1 shows a perspective view of the present invention in relation to a building with which it may be used.

FIG. 1 illustrates the operation of a pesticide electrostatic charger 10 constructed in accordance with the teaching of the present invention. Pesticide charger 10 may operate in connection with a conventional building 12, such as a residence, office, or other structure. As is conventional, building 12 has a draining or sewer system 14. Pests, such as roaches, other insects, small rodents, small reptiles, and the like, may breed and generally reside within draining system 14, and human residents of building 12 may, for their health and well being, wish such pests exterminated.

Draining system 14 includes one or more vents 16 which typically extend above a roof portion 18 of building 12. In addition, draining system 14 may couple to a municipal sewer or draining system 20. A clean-out plug 22 provides one point of access to draining system 14. As is conventional, draining system 14 may include many feet of pipe with few access points thereto.

Figure 2:
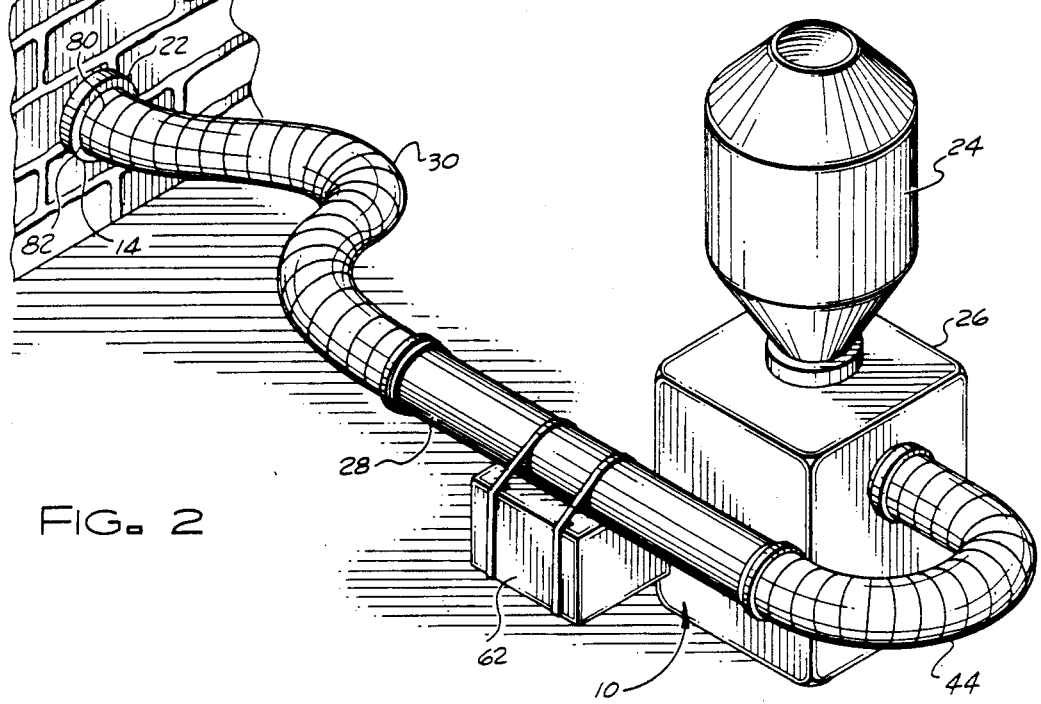
FIG. 2 shows a perspective view of the present invention in relation to a typical building sewer clean-out plug.

FIG. 2 shows pesticide charger 10 in more detail relative to building 12. FIG. 3 shows a schematic view of pesticide charger 10. With reference to FIGS. 2 and 3, pesticide charger 10 generally includes a blower 24, a reservoir 26, a charging chamber 28, and a delivery hose 30. Blower 24 may be implemented using any fan, turbine, or other forced air supplying apparatus. Blower 24 has an air intake 32 which sucks air in from the environment around pesticide charger 10. In addition, blower 24 has an air exhaust 34 which supplies forced air. In the preferred embodiment, blower 24 is driven by an electrical motor (not specifically shown).

Moreover, blower 24 is configured so that the rate of air flow from exhaust 34 is limited. The limiting of air flow is believed to be one of the factors which allows the present invention to demonstrate improved efficiency. Specifically, the rate of air flow is limited to less than 500 cubic feet per minute (CFM), and preferably less than 300 CFM. While such a flow rate works acceptably well for both residential and municipal use, even greater efficiency may be obtained by limiting air flow to around 150 CFM or less when pesticide charger 10 is used for extermination purposes in connection with typical residential applications. Those skilled in the art may utilize conventional techniques in the design of blower 24 to achieve a desired flow rate.

Exhaust 34 of blower 24 removably couples to an air intake 36 in an upper portion of reservoir 26. Reservoir 26 additionally has an exhaust 38, which resides in the upper regions of reservoir 26. In the preferred embodiment, an opening approximately 2 inches in diameter in a wall 40 of reservoir 26 serves as exhaust 38. Except for intake 36 and exhaust 38, reservoir 26 is an enclosed container that is dimensioned to hold around 1 to 2 gallons of a pesticide dust 42. In the preferred embodiment, dust 42 is placed within reservoir 26 by temporarily removing blower 24 from reservoir 26. The precise quantity of dust 42 within reservoir 26 is limited so that the upper surface of dust 42 does not extend upward to either intake 36 or exhaust 38 during the normal operation of pesticide charger 10.

Any one of several powdered insecticides or pesticides which are known to those skilled in the art may serve as pesticide dust 42 in the present invention. However, in order to achieve as high an efficiency as possible in the application of dust 42 to draining systems 14 or 20 (see FIG. 1), a powered pesticide which readily accepts and retains a good static charge is preferred. In addition, dust 42 is preferably safe for use in and around humans, pets, and plants. A mixture of an active powered pesticide with bentonite powder, as disclosed in U.S. Pat. No. 3,322,623, discussed above and incorporated herein by reference, serves as one suitable example of pesticide dust 42. In particular, the active powered pesticide which is commonly sold under the tradename SEVIN, when mixed with bentonite power as disclosed in the '623 patent, has been efficiently and effectively used in connection with the present invention.

A flexible hose 44, approximately 2 inches in diameter in the preferred embodiment, couples to exhaust 38 of reservoir 26 and to an intake end 45 of charging chamber 28. Clamps 46 attach reservoir 26 and charging chamber 28 to hose 44 so that substantially no air escapes from pesticide charger 10 between reservoir 26 and charging chamber 28. In the preferred embodiment, charging chamber 28 includes a conductive tube 48, which is substantially straight, approximately 2 inches in diameter, and 12-24 inches long. For example, a section of conventional stainless steel conduit may serve as conductive tube 48.

In addition, charging chamber 28 includes an electrode 50, which resides within tube 48. In the preferred embodiment, a cylindrically shaped wire brush serves as electrode 50. Accordingly, electrode 50 has a conductive core 52 which is substantially straight and which is centrally located within tube 48. Generally speaking, core 52 lies parallel to the axis of tube 48. A multiplicity of conductive bristles 54 attach to core 52 and extend radially outward therefrom toward the interior walls of tube 48. Preferably, tips 56 of bristles 54 are spaced at least $\frac{1}{4}$ inch away from the interior walls of tube 48 so that no physical contact occurs between electrode 50 and tube 48 during the normal operation of pesticide charger 10. Each of bristles 54 is a stiff, small diameter wire. Overall, electrode 50 exhibits a diameter around $\frac{1}{2}$-1 inch and a length of around 2-4 inches. For example, a wire brush which is commonly intended for use in cleaning the barrel of a large caliber shotgun may advantageously serve as electrode 50.

Electrode 50 is supported within tube 48 by a wire tripod 58. A suitable adhesive attaches tripod 58 to footings 60 and attaches footings 60 to the interior walls of tube 48. Footings 60 are formed from a suitable electrical insulator, such as fiberglass. Accordingly, footings 60 electrically insulate electrode 50 from tube 48 while physically supporting electrode 50 within tube 48.

Pesticide charger 10 additionally includes a power supply 62, which physically and electrically couples to charging chamber 28. Power supply 62 utilizes a conventional solid state design to generate high voltage DC energization, preferably in the range of 15-25 KV at a few milliamps. It is preferable that the voltage output from power supply 62 be limited to this range because a lesser voltage may not as effectively impart static charges to dust 42 and may therefore diminish the efficiency of pesticide charger 10. And, a greater voltage may tend to generate ozone, which has been shown to be hazardous to the environment. Power supply 62 may utilize conventional power supply design techniques to manipulate either AC voltage from the public power distribution networks or DC voltage from a battery to generate this high voltage energization.

A positive potential wire 64 couples from a positive output voltage terminal 66 of power supply 62, located outside of charging chamber 28, through an opening 68 in tube 48, to electrode 50. A suitable grommet 70 or other sealing composition surrounds wire 64 at opening 68 to protect wire 64 from damage and to prevent excessive quantities of air from escaping from charging chamber 28 through opening 68. Wire 64 is surrounded by a suitable insulating jacket (not shown) for the voltage generated by power supply 62. A negative potential wire 72 couples from a negative output voltage terminal 74 of power supply 62 to the outside of tube 48 and to earth ground (not shown). Conventional attaching techniques, such as soldering, clamping, bolting, crimping, and the like, are used to attach wires 64 and 72 to power supply 62 and to charging chamber 28.

An intake end 76 of delivery hose 30 couples to an exhaust end 78 of charging chamber 28. Preferably, delivery hose 30 is a nonconductive, flexible hose which firmly clamps to exhaust end 78 of charging chamber 28 so that it does not inadvertently become decoupled and so that no substantial quantity of air escapes pesticide charger 10 at this junction. In the preferred embodiment of the present invention, delivery hose 30 is approximately 2 inches in diameter and at least 24 inches long.

An exhaust end 80 of delivery hose 30 serves as a nozzle 82, which is adapted for a particular use to which pesticide charger 10 is put. FIG. 2 shows a first embodiment of nozzle 82, which is adapted for typical residential use. In this use, nozzle 82 is inserted into draining system 14 through clean-out plug 22 if possible, or alternately through one of vents 16 (see FIG. 1). For this application, nozzle 82 is configured to present a minimum restriction to air flow. Consequently, for this embodiment, nozzle 82 represents an approximately 2 inch circular opening at the end of delivery hose 30.

FIG. 4 shows a second embodiment of nozzle 82, which is adapted for a typical municipal sewer system application. As shown in FIG. 4, municipal draining system 20 may be accessed through a manhole cover 84. Manhole cover 84 includes a small rectangular opening 86 therein to aid the lifting of cover 84. For municipal use it is advantageous to access draining system 20 without removing manhole cover 84. Since cover 84 is typically heavy, the removal of cover 84 requires great effort, and its removal is a time consuming process. Accordingly, in this second embodiment, nozzle 82 is configured to mate with opening 86. Thus, air flow may be directed into draining system 20 through opening 86 without removing manhole cover 84.

With reference to FIGS. 1-4, the operation of the present invention begins with the placement of pesticide dust 42 into reservoir 26, as discussed above, and the placement of nozzle 82 into draining system 14 or 20, as described above. Next, pesticide charger 10 is energized by operating blower 24 and power supply 62. Blower 24 forces air into reservoir 26. This forced air has sufficient velocity to cause the upper layers of pesticide dust 42 within reservoir 26 to become airborne. This forced air propels dust 42 through exhaust 38, charging chamber 28, delivery hose 30, and into draining system 14 or 20.

As dust 42 passes through charging chamber 28, it comes into close proximity with electrode 50. An ion cloud forms around electrode 50 due to the high voltage energization of electrode 50 relative to tube 48. Since electrode 50 has a multiplicity of bristles 54 dispersed over a substantial volume within tube 48, this ion cloud is evenly distributed through a significant volume within the interior of chamber 28. As dust 42 encounters this ion cloud, it becomes electrostatically charged relative to tube 48 and earth ground. Apparently, the relatively even distribution of the ion cloud over a significant volume causes dust 42 to become thoroughly charged. In other words, a large percentage of the particles of dust 42 that passes through charging chamber 28 receives an effective static charge.

Since the individual microscopic particles of dust 42 all receive the same polarity static charge, they tend to repel one another and form a lyophobic extrinsic colloidal aerosol. This aerosol is propelled through delivery hose 30 and into draining system 14 or 20 due to the forced air action from blower 24 and the mutual repellant characteristic. The pipes which make up draining systems 14 and 20 typically exhibit no electrostatic charge, or a charge approximately the same as earth ground. As the aerosol enters draining system 14 or 20, the particles of dust 42 are attracted to the interior walls of draining system 14 or 20 where they become attached in the numerous microscopic nooks and crannies of the interior of the pipes. Once attracted to the interior walls of draining system 14 or 20, the particles do not instantly lose their charge, and subsequent aerosol is repelled from a previously coated section of system 14 or 20.

When delivery hose 30 is inserted into clean-out plug 22 (see FIGS. 1 and 2), pesticide charger 10 preferably operates only until the aerosol is observed escaping from vents 16. At this point, continued operation of charger 10 would only waste pesticide dust 42. When vents 16 are not observable or when delivery hose 30 is inserted into one of vents 16 or into opening 86 in manhole cover 84 (see FIG. 4), pesticide charger 10 is preferably operated for a predetermined period of time, such as 10-20 seconds, then stopped. This predetermined period of time is chosen so that adequate coverage will normally result.

When the present invention is utilized in connection with building 12, screens 88 are affixed over vents 16, as shown in FIG. 1, and permanently attached thereto using any suitable securing means (not shown). Screens 88 are configured to prevent pests from escaping out of draining system 14 at vents 16 while freely permitting air and other gasses to pass. Thus, pests are forced to remain in a dusted draining system 14 where they die from exposure to dust 42 and are then washed away in draining systems 14 and 20.

In summary, the present invention provides an improved apparatus and method for electrostatically charging and applying pesticide dust 42. The present invention achieves particularly high efficiency in the consumption of dust 42 and in the effectiveness of delivering dust 42. Apparently, this efficiency and effectiveness is due, at least in part, to the limits placed on air flow rate, the efficient technique used to move air and pesticide dust 42 through charging chamber 28, and the particularly thorough and effective static charge imparted to pesticide dust 42 within charging chamber 28. In addition, the present invention may be configured as a portable device which is suited for use in connection with buildings as well as a municipal sewer system. The high efficiency achieved by the present invention suggests that the present invention need hold only a small quantity of pesticide dust 42.

The present invention has been described above with reference to preferred embodiments. However, those skilled in the art will recognize that changes and modifications may be made in these preferred embodiments without departing from the scope of the present invention. For example, the various dimensions, materials, and compounds discussed herein may be widely varied without departing from the scope of the present invention. These and other changes and modifications which are obvious to those skilled in the art are intended to be included within the scope of the present invention.

What is claimed is:

1. A method of exterminating pests from a building draining system having a clean-out plug and a vent, said method comprising the steps of:
   coupling an exhaust port of an air propelling device to a reservoir which holds a pesticide dust;
   forcing air from said air propelling device into said reservoir to propel said pesticide dust along with said air out from said reservoir;
   limiting the air flow from said air propelling device to a rate of less than 300 cubic feet per minute;

transporting said propelled pesticide dust through a conductive tube;

locating an electrode having a multiplicity of spaced apart conductive bristles within said tube so that said conductive bristles are distributed within and insulated from said conductive tube and so that said propelled pesticide dust comes in proximity with said electrode;

energizing said electrode relative to said tube to electrostatically charge said pesticide dust;

routing said electrostatically charged dust and air into said draining system clean-out plug;

stopping said routing step when said electrostatically charged dust escapes from said draining system vent; and attaching a screen to said vent to prevent escape of said pests from said vent.

* * * * *

UNITED STATES PATENT AND TRADEMARK OFFICE
CERTIFICATE OF CORRECTION

PATENT NO. : 5,050,338

DATED : 24 September 1991

INVENTOR(S) : Peter P. Doakley and Christopher M. Bruemmer

It is certified that error appears in the above-identified patent and that said Letters Patent is hereby corrected as shown below:

On the Title page:

Change "[76] Inventors: Peter P. Doakley, 7865 N. 49th Ave., Glendale, Ariz. 85301; Christopher M. Bruemmer, 7202 W. Turney, Phoenix, Ariz. 85033" to --[76] Inventors: Peter P. Doakley, 4447 West Sanna Street, Glendale, Arizona 85302; Christopher M. Bruemmer, 7867 North 49th Avenue, Glendale, Arizona 85301--.

Signed and Sealed this

Twelfth Day of January, 1993

*Attest:*

DOUGLAS B. COMER

*Attesting Officer*  Acting Commissioner of Patents and Trademarks